United States Patent Office 2,994,909
Patented Aug. 8, 1961

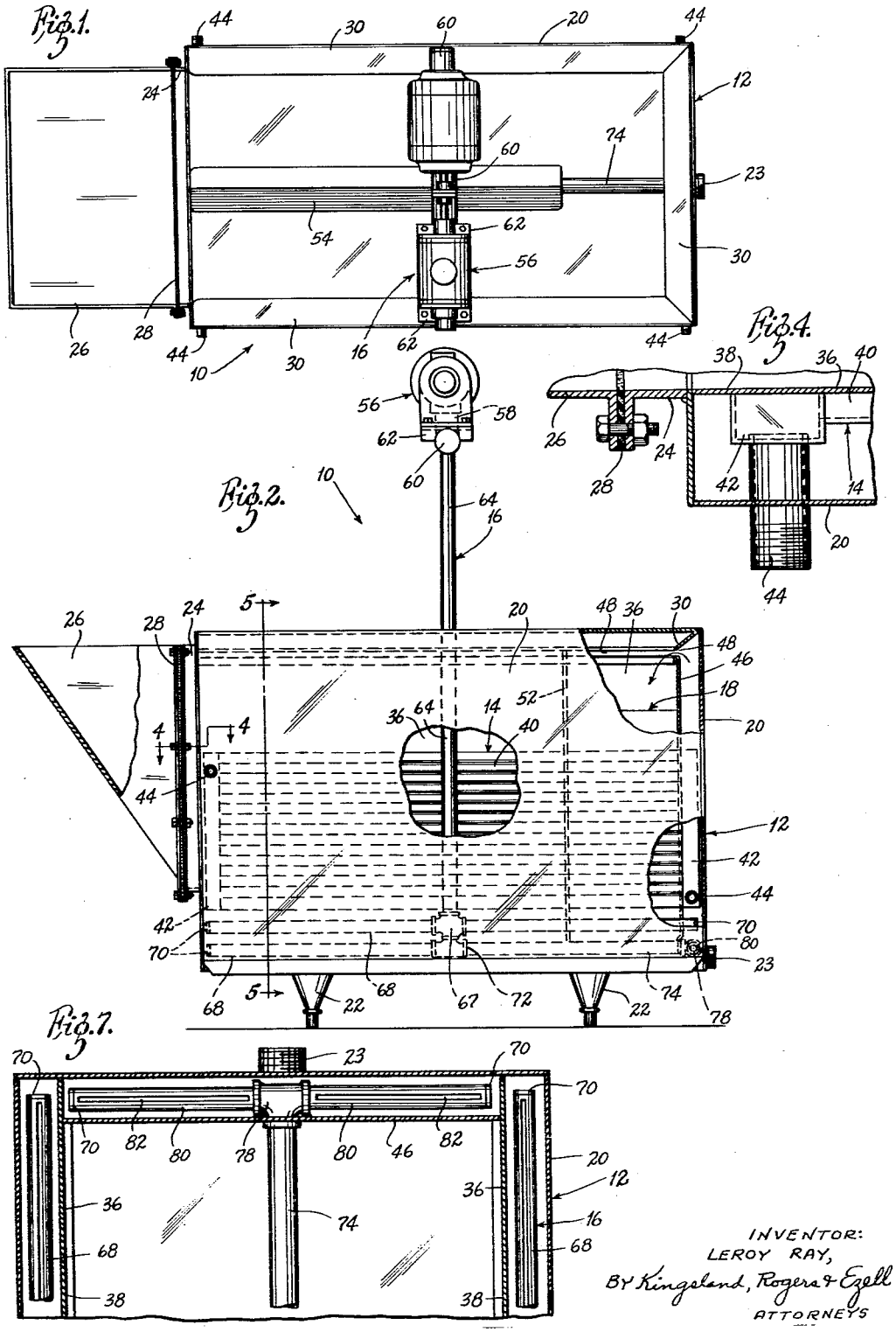

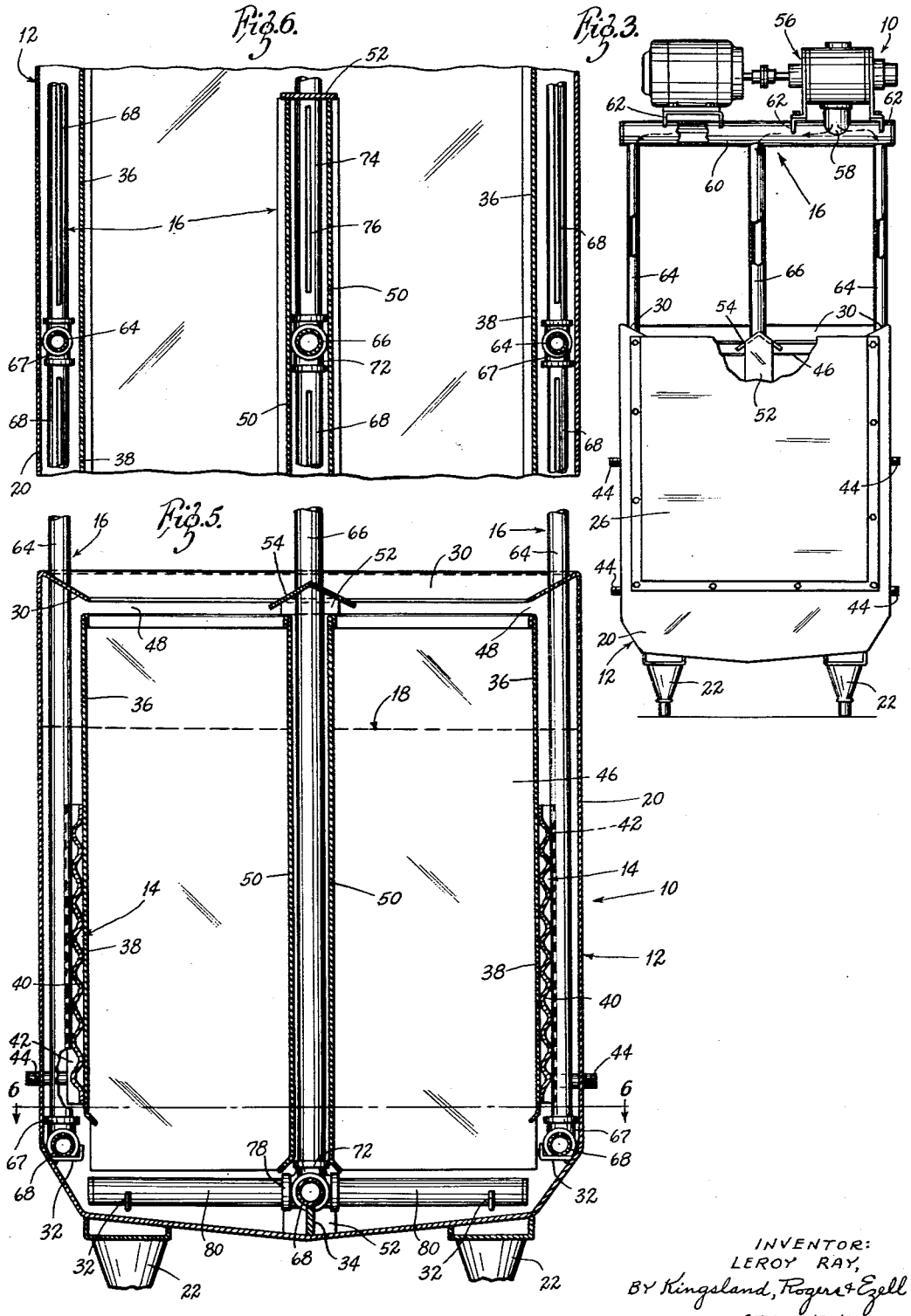

2,994,909
POULTRY SCALDER
Leroy Ray, Springfield, Mo., assignor to Paul Mueller Company, Springfield, Mo., a corporation of Missouri
Filed Dec. 31, 1958, Ser. No. 784,195
7 Claims. (Cl. 17—11.2)

The present invention relates generally to apparatus for scalding poultry, and more particularly to a poultry scalder which incorporates a novel arrangement for maintaining continuous circulation of scalding water over the fowls passed therethrough.

The proper scalding of fowls entails submergence of the birds in turbulent scalding water for a predetermined minimum period of time. The fact that the birds are lighter than water, however, necessitates an arrangement whereby they may be either held by mechanical means below the surface of the water or subjected to a continuous fall of scalding water into a bath in which they are floated.

The present invention, making use of the latter method, contemplates a generally rectangular tank filled to an upper level with water which is kept at scalding temperature by means of closed circuit, steam heated heat exchangers disposed within the tank. The water is circulated in the tank by means of an airlift principle wherein air is released near the bottom of the tank to travel upwardly through appropriately arranged baffles provided at the sides and also at the center of the tank. The aerated water ascends to the top of the tank and is there deflected in a waterfall which keeps the poultry under the surface and increases the efficiency of scalding.

It is an object of the present invention to provide a novel poultry scalder in which scalding hot water is circulated in a predetermined vertical circuit to provide a continuous fall onto the surface of a water bath.

It is another object of the invention to provide a novel poultry scalder in which the circulated water is conducted past a heat exchanger immediately prior to being discharged for free fall onto the surface of the bath.

It is another object of the invention to provide a novel poultry scalder which eliminates the need for rotating impellers and the like to be submerged in the water bath.

It is another object of the invention to provide a novel poultry scalder which defines a U-shaped path for passing fowls through a scalding water bath and which incorporates means for continuously discharging scalding water from opposite sides along said path downwardly upon the surface of the water bath.

The foregoing, along with additional objects and advantages, will be apparent from the following description of a specific embodiment of the invention as depicted in the accompanying drawings, in which:

FIGURE 1 is a top plan view of a poultry scalder conforming to the present invention;

FIGURE 2 is a side elevation thereof, portions being broken away to reveal details of construction;

FIGURE 3 is an end elevation, parts again being shown in section, the view being taken from the left of FIGURES 1 and 2;

FIGURE 4 is an enlarged fragmentary section taken generally along the horizontal section line 4—4 of FIGURE 2;

FIGURE 5 is an enlarged section taken generally along the vertical section line 5—5 of FIGURE 2, portions at the top and at the bottom of the figure being broken away in order to conserve space on the drawing;

FIGURE 6 is a fragmentary section taken generally along the horizontal section line 6—6 of FIGURE 5; and FIGURE 7 is a horizontal section similar to that of FIGURE 6, but showing the end of the scalder remote from the entrance and exit chute.

Directing attention more particularly to the details of the drawings, the numeral 10 designates a poultry scalder constructed in conformance with the teachings of the present invention. The scalder 10 comprises a tank assembly 12 which incorporates heat exchangers 14, and which is provided with an air dispensing assembly 16. As is clear from the several figures of the drawing, the tank assembly 12 is generally rectangular and is constructed so as to retain a water bath having a normal surface level somewhat below the top, as indicated at 18 in FIGURES 2 and 5. These figures show also the general construction features of the assembly 12, which include an outer shell 20 fabricated from sheet material comprising the sides and bottom of the tank 12. The shell 20 has legs 22, preferably of familiar leveling type, and is provided with a lower drain 23 at one end. One of the ends of the shell 20 is open, and is provided with an angular flange 24 to which is secured, as by bolting, a receiver chute 26 for introducing and removing the fowls treated in the apparatus. The joint between the chute 26 and the flange 24 is calked or gasketed as indicated at 28.

The top edge of the outer shell 20 is provided with an inwardly and downwardly directed flange 30 which extends the full length along each of the longitudinal sides of the shell and across the end remote from the chute 26, as shown in FIGURE 1. At the lower end of the same two sides and end panel, the shell 20 is provided with hangers 32 formed to an appropriate shape, as illustrated, and welded in place to serve as supports for elements of the air dispensing assembly 16 to be described hereinafter. An additional support 34, which may take the form of an upright plate or strip as illustrated in FIGURE 5, is provided in the center of the bottom of the shell 20.

Within the outer shell 20, the tank assembly 12 incorporates an arrangement of baffles which includes longitudinal baffles 36 extending the full length of the interior of the shell 20 and spaced inwardly from the outer side panels thereof as indicated in the sectional views of the drawings. The baffles 36 take the form of panels 38 of sheet material having their vertical end edges welded into opposite ends of the shell 20 and having their upper and lower horizontal free edges bent as illustrated to provide increased stiffness along these edges. To the outside lower portion of each of the panels 38 is secured, as by welding, a corrugated panel 40 with the corrugations extending longitudinally of the panel 38.

The corrugated panels 40 extend somewhat less than the full length of the panels 38, and it will be understood that the securement of these panels is such as to provide a steam-tight conduit from one end to the other. As indicated in FIGURES 2 and 4, vertical headers 42 are provided at each end of the panels 40, and each header 42 is provided with a nipple 44 extending outwardly through the outer shell 20 for connection into an external steam circuit (not shown).

An end baffle 46 is provided in spaced relation to the end of the tank 12 remote from the chute 26. This baffle takes the form of a single panel extending between the side panels 36 and having its upper and lower free edges bent similar to the latter panels. As best shown in FIGURE 5, the upper edges of the baffles 36 and 46 cooperate with the free inner edges of the previously mentioned flange 30 to provide a slot-like discharge opening 48 for a purpose to appear.

In addition to the side and end baffles already described, the tank assembly 12 includes a center baffle arrangement comprising parallel panels 50 spaced apart as indicated in FIGURES 5 and 6 to provide a vertical passage therebetween. An end plate 52 is secured, as by welding, to each end of the panels 50, the upper and lower edges of the latter being formed in the same manner as the previously described baffle panels and remaining free. The end plates 52 extend above the upper edges of the panels 50 to support a deflector 54 having an inverted V-shape, as is clear from FIGURES 3 and 5. It should be noted that the center baffle, including its deflector plate 54, extends from the chute end of the tank assembly 12 to a point which is spaced from the opposite end of the tank a distance approximately equal to the distance between the center baffle and the sides of the tank assembly. Thus, there is defined a U-shaped path extending from the chute 26 along one side of the center baffle, across the end of the tank, and returning along the other side of the center baffle.

The air dispensing system 16 comprises a motor driven air compressor, designated generally by the numeral 56, having its discharge outlet connected by means of a pipe 58 to a manifold 60. Where, as in the present illustration, it is desired to make the air system self-contained along with the remainder of the scalder 10, appropriate brackets as indicated at 62 may be secured directly to the manifold pipe 60 for mounting the compressor and its prime mover.

Preferably, the compressor assembly 56 is elevated well above the tank assembly 12 so as to remove it from the vicinity of the water bath and still provide direct piping of compressed air to the tank 12. Three distributing pipes are communicated with the manifold 60. They include two outside feeder pipes 64, one extending downwardly on each side of the tank 12, and a center feeder pipe 66 extending downwardly at the middle of the tank 12. As indicated in FIGURES 2, 3 and 5 of the drawings, the outside pipes 64 extend through holes formed in the deflector flanges 30 and pass downwardly between the adjacent baffle 36 and outside panel of the shell 20. Immediately below the lower free edges of the baffles 36, the pipes 64 are connected by means of T-fittings 67 to oppositely horizontally extending diffuser pipes 68. The diffuser pipes 68 extend substantially to their respective ends of the tank 12 where they terminate in an end closure 70. The uppermost portion of each of the diffuser pipes 68 is longitudinally slotted, as illustrated in FIGURES 5 through 7 for discharge of compressed air upwardly into the passageway defined by the outer shell and the adjacent baffles 36. It is of course evident that diffuser pipes constructed so as to have air pervious walls could be employed in place of the slotted pipes illustrated in the drawing.

The center feeder pipe 66 extends downwardly parallel with the pipes 64 and passes through an appropriately located hole in the deflector 54 and between the baffle panels 50 to a T-fitting 72 from which extends a slotted diffuser pipe 68 towards the front or chute end of the tank 12 and a diffuser-feeder pipe 74 toward the opposite end of the tank. The pipe 74 differs from the pipes 68 in that it has an upper slot 76 which extends only approximately to the end of the center baffle, from which point the pipe 74 continues unslotted to a T-fitting 78 adjacent the end panel of the shell 20. A pair of diffuser pipes 80 extend oppositely from the fitting 78 and have upper slots 82 disposed for discharge upwardly between the end baffle 46 and the adjacent end panel of the shell 20. As is clear from the several figures of the drawing, the horizontally disposed diffuser pipes in the air distributing assembly are supported on the support brackets 32 and 34 of the tank assembly 12.

In use, the poultry scalder 10 contains scalding hot water to approximately the level indicated by the numeral 18, which is substantially below the discharge slot 48 defined between the upper edges of the baffles and the deflecting flange 30 and plate 54. The water is maintained at a scalding temperature by continuous heating resulting from passage of steam through the heat exchangers 14. Steam for heating is delivered from an external source (not shown) and introduced through the nipples 44, the condensate being withdrawn from the opposite end of the heat exchanger and returned to the external source. This differs somewhat from previous practice in the poultry scalding art, wherein live steam has customarily been discharged directly into the water bath. The latter method of heating may, of course, be employed if preferred.

The air compressor 56 delivers compressed air which is discharged in a diffused state near the bottom of the water bath so as to rise upwardly through the passages defined by the above described baffle arrangement in the tank assembly 12. This diffusion of air into the water at this point provides a mixture of air and water which is, of course, lighter than the solid water in the interior of the bath, the result being that the mixture rises above the surface level 18 and is discharged through the slot 48 so as to shower downwardly upon the surface of the bath. The arrangement is such as to provide a continuous shower from opposite sides of a U-shaped path extending from the chute 26 the full length of the tank 12 on one side of the center baffle and returning on the other side back to the chute 26. It will be noted, incidentally, that the incorporation of the heat exchangers 14 in the outside baffle passages assures that the water circulated through these passages passes directly over the heat exchanger surface, and, inasmuch as the water is taken from the bottom of the bath, there is assurance of continuous and uniform heating of the water constituting the bath.

The birds to be scalded are, of course, introduced at the chute end of the scalder and passed around the U-shaped path above-mentioned to be withdrawn at the same end of the scalder. Despite the tendency of the birds to float in the water bath, the continuous shower of scalding water from above provides an efficient and thorough scalding operation.

Clearly, there has been provided a poultry scalder which fulfills the objects and advantages sought therefor.

It is to be understood that the foregoing description and the accompanying drawings have been given only by way of illustration and example. It is further to be understood that changes in the elements, rearrangement of parts, and the substitution of equivalent elements, all of which will be apparent to those skilled in the art, are contemplated as being within the scope of the invention, which is limited only by the claims which follow.

What is claimed is:

1. In a poultry scalder, in combination, an elongated tank assembly for containing water, said assembly comprising an outer shell of elongated configuration and including parallel side walls, an opening through one of the side walls for the introduction of fowls into the tank, a central baffle extending from the last-mentioned side wall to a point short of the opposite side wall, the path of the fowls through the container being thus defined from the opening along one side of the central baffle, back along the other side of the central baffle and returning to the opening for removal from the tank; a plate-like baffle disposed inwardly of those side walls adjacent the path of the fowls and extending substantially the full length of those side walls, said baffles having lower edges spaced above the bottom of the tank and upper edges at a lower level than the upper edges of the associated sides of the outer shell so as to define vertical passages through which water may be circulated from the lower center portion of the tank upwardly between the baffles and their respectively associated shell walls and returned to the upper center portion of the tank, means along the upper end of said vertical passages for directing the circulating water into a waterfall inwardly of the baffles, means for effecting an upward flow of water through said passages, the central baffle comprising a pair of plate-like panels disposed in spaced apart relation and provided with end closures to define a central vertical passage for upward flow of water, means at the top of said central vertical passage for directing water into waterfalls on opposite sides of the center baffle, and means for effecting an upward flow of water through said central vertical passage.

2. The combination of claim 1 wherein the means for effecting the aforesaid water flow comprises air dispensing means adapted to release air uniformly along the lower ends of the several vertical passages.

3. The combination of claim 1 wherein the means for effecting the aforesaid water flow comprises air blower means, manifold means for receiving air from the blower means, conducting means for conducting air from the manifold means to a point of release, and diffuser means for releasing the air uniformly along the vertical passages.

4. The combination of claim 3 wherein the air conducting means comprises parallel pipes extending downwardly through respective ones of said vertical passages, said manifold means being in surmounting relation to said pipes, and said blower means being mounted on said manifold means.

5. In a poultry scalder, in combination, a generally rectangular open-topped tank, baffle means spaced inwardly from each side wall and from one end wall of the tank so as to define vertical passages extending upwardly along said walls, additional baffle means disposed centrally of said side walls and extending from the other end of the tank a distance substantially less than the full length of the tank so as to define a U-shaped horizontal path in the tank, said additional baffle means comprising a dual panel arrangement defining a central vertical passage, air diffuser pipes disposed along the lower end of each of said vertical passages for diffusing air thereinto, and air distributing means for supplying air to said diffuser pipes, said latter means including two outside feeder pipes extending downwardly through respective side vertical passages, a center feeder pipe extending downwardly through the central vertical passage, and a diffuser feeder pipe extending horizontally beyond the end of the additional baffle means to the diffuser pipe adjacent the end wall of the tank.

6. The combination of claim 5 wherein the upper end of each vertical passage is provided with means for deflecting water in a waterfall outside the aforesaid vertical passages, and wherein the aforesaid other end of the tank is provided with a chute for introducing and removing poultry beyond said waterfall.

7. The poultry scalder of claim 6 with heat exchanger means disposed within the passage means for heating the water and the diffused air and water.

References Cited in the file of this patent

UNITED STATES PATENTS

| | | |
|---|---|---|
| 1,036,988 | Fink | Aug. 27, 1912 |
| 1,672,555 | Barker et al. | June 5, 1928 |
| 1,864,135 | Hill | June 21, 1932 |
| 2,113,806 | Hubbard | Apr. 12, 1938 |
| 2,649,615 | Sharp | Aug. 25, 1953 |
| 2,710,985 | Zebarth | June 21, 1955 |

FOREIGN PATENTS

| | | |
|---|---|---|
| 739,005 | France | Oct. 24, 1932 |